(12) United States Patent
Saito et al.

(10) Patent No.: US 6,762,904 B2
(45) Date of Patent: Jul. 13, 2004

(54) MAGNETIC RECORDING AND REPRODUCTION APPARATUS

(75) Inventors: Yoshiyuki Saito, Osaka (JP); Akio Konishi, Hyogo (JP); Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 194 days.

(21) Appl. No.: 10/147,736

(22) Filed: May 16, 2002

(65) Prior Publication Data

US 2002/0176204 A1 Nov. 28, 2002

(30) Foreign Application Priority Data

May 25, 2001 (JP) ........................................ 2001-156552

(51) Int. Cl.⁷ .......................................... G11B 15/665
(52) U.S. Cl. .......................................... 360/85; 360/95
(58) Field of Search ............................. 360/84, 85, 95, 360/96.5, 130.21, 130.22, 130.23, 130.32

(56) References Cited

U.S. PATENT DOCUMENTS 4,258,399 A * 3/1981 Iijima et al. ................. 360/85
4,459,625 A * 7/1984 Kawase ....................... 360/85
5,025,333 A * 6/1991 Feinberg et al. ............... 360/85
5,173,817 A * 12/1992 Feinberg ....................... 360/85

* cited by examiner

Primary Examiner—William Klimowicz
(74) Attorney, Agent, or Firm—Renner, Otto, Boisselle & Sklar, LLP

(57) ABSTRACT

A magnetic recording and reproduction apparatus includes a tape guide element guiding member for guiding a tape guide element; a bendable chain-like driving member having a first end and a second end, the chain-like driving member being connected to the tape guide element guiding member at the first end, and the second end of the chain-like driving member being pulled or pushed so as to produce a reciprocating movement of the tape guide element guiding member; and a chain guiding member for guiding the chain-like driving member. The chain-like driving member includes a plurality of flexures for facilitating a bending movement of the chain-like driving member. The chain-like driving member causes a reciprocating movement of the tape guide element while being bent during a loading operation and an unloading operation.

12 Claims, 16 Drawing Sheets

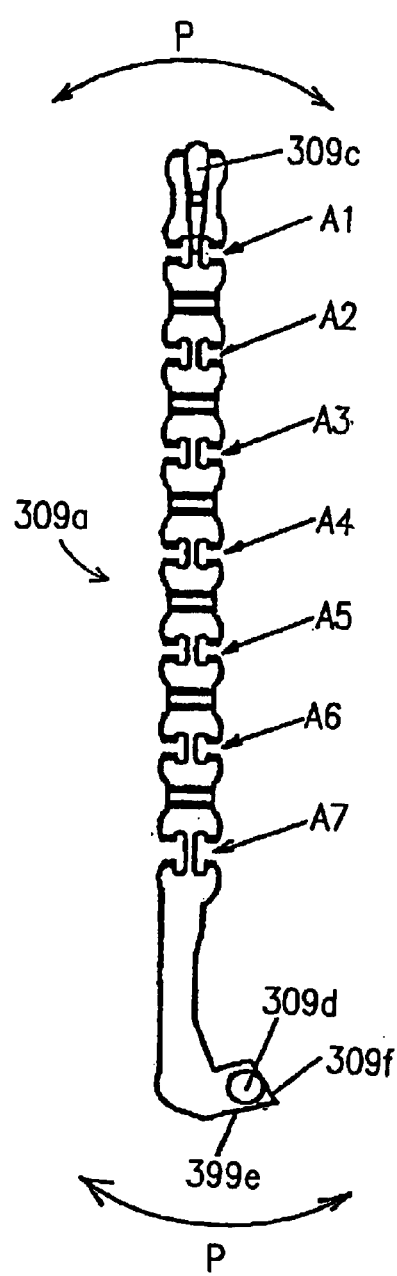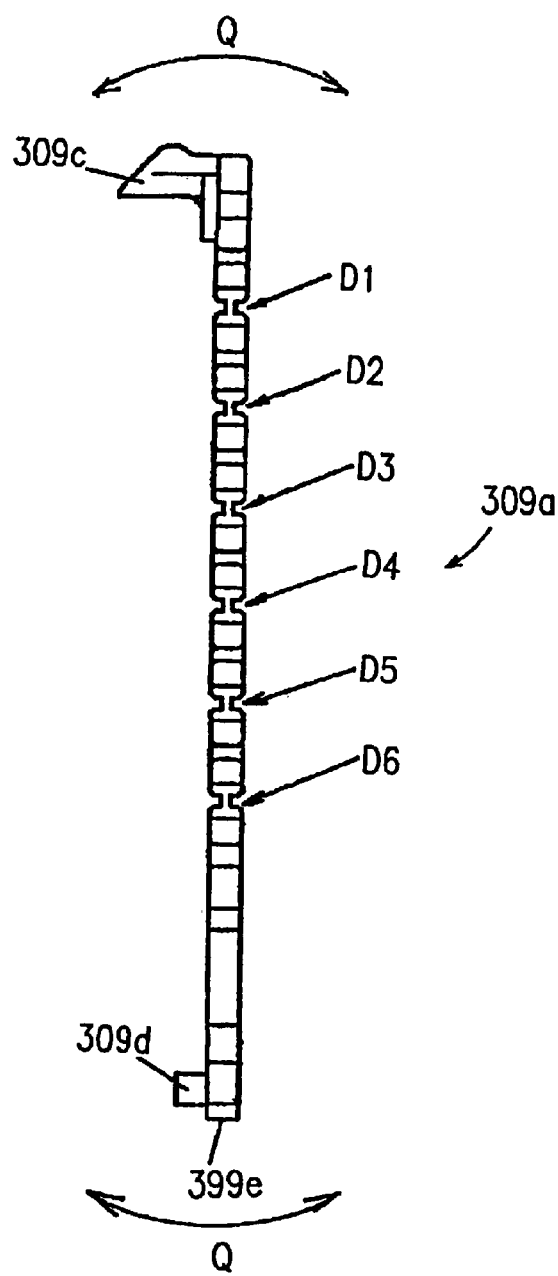

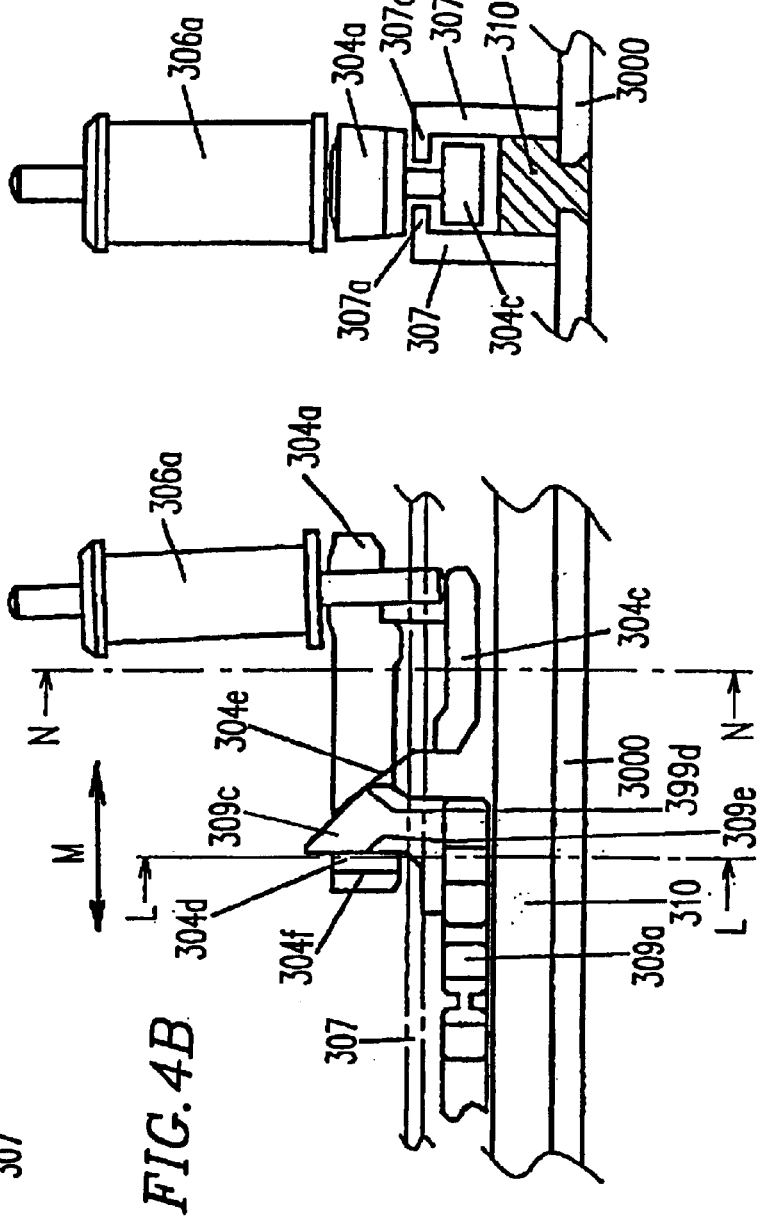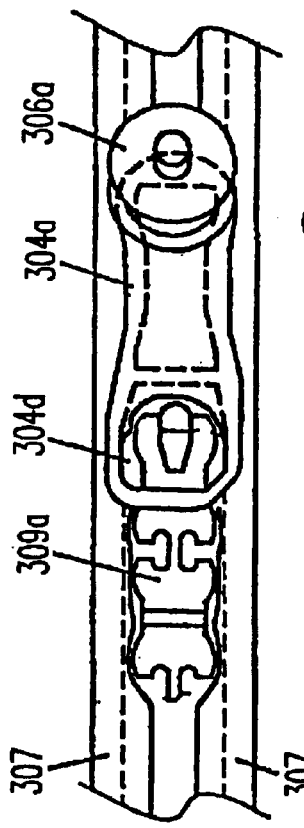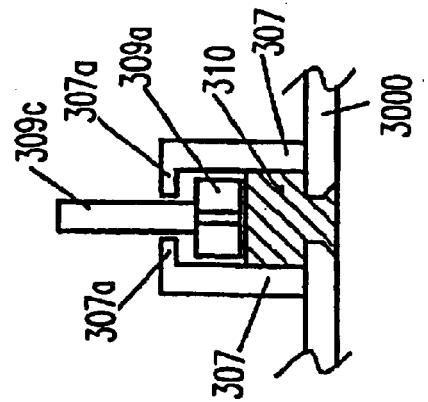

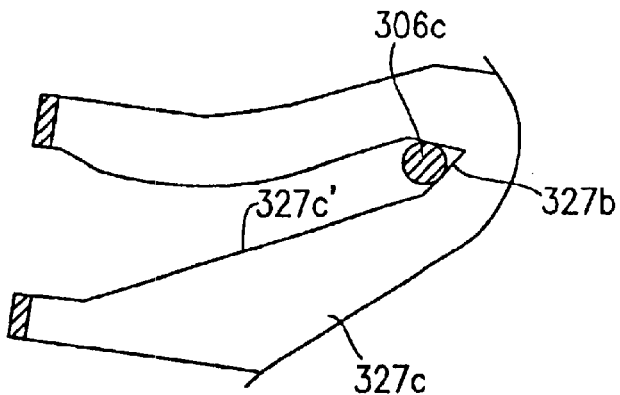
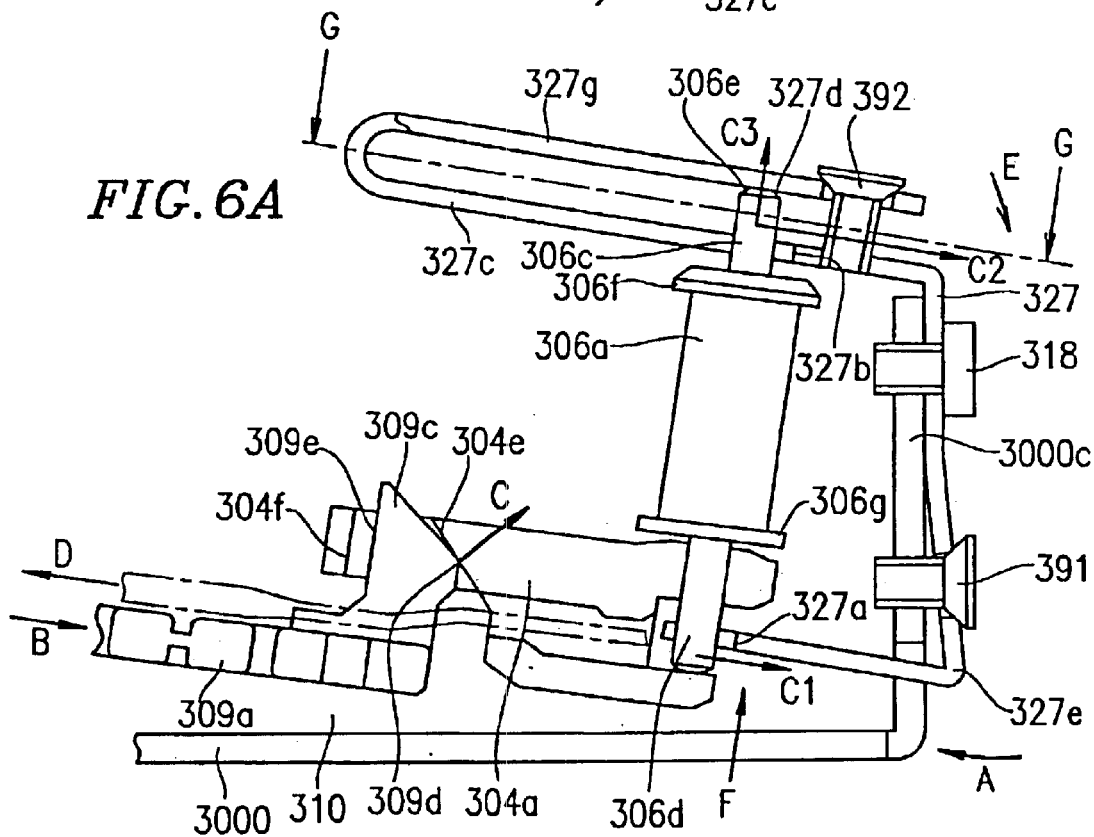
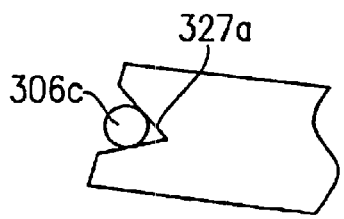

MAGNETIC RECORDING AND REPRODUCTION APPARATUS

BACKGROUND OF THE INVENTION

1. Field of the Invention

The present invention relates to a tape loading apparatus used for a magnetic recording and reproduction apparatus.

2. Description of the Related Art

According to a general tape loading mechanism used in a conventional magnetic recording and reproduction apparatus, a tape is pulled out from a tape cassette and wound around a rotational head cylinder. Transportation members are positioned as follows.

Transportation members having tape guide posts projecting therefrom are transferred and positioned by a plurality of links or arms, which are pivotally engaged with a pivoting shaft of each transportation member.

A tape loading mechanism of a conventional magnetic recording and reproduction apparatus will be described.

FIG. 12 is a plan view of a magnetic recording and reproduction apparatus 1200 described in Japanese Laid-Open Publication No. 11-273191. In FIG. 12, a tape 2 is not yet loaded.

An S (supply-side) boat 39 and a T (takeup-side) boat 40 each serve as a tape drawing member provided on a main chassis 8. Pins 41A and 41B provided on the S boat 39, and pins 41C and 41D provided on the T boat 40, are in engagement with a long hole 43 of a rail 42. The S boat 39 and the T boat 40 move along the long hole 43. An S2 post 44 and an S1 post 45 are provided on the S bout 39, and a T1 post 46 and a T2 post 47 are provided on the T boat 40. As the S boat 39 and the T boat 40 move, the posts 44, 45, 46 and 47 act to wind the tape 2 around a rotational head cylinder 38. Reference numeral 48 is a rail section provided on the main chassis 8.

FIG. 13 is another plan view of the tape loading mechanism 1200. FIG. 13 shows a portion of the tape loading mechanism 1200 which is on the main chassis 8. FIG. 14 is an enlarged view of the S boat 39 and the T boat 40. In FIGS. 13 and 14, a boat driving arm 73 is supported on the main chassis 8 by a shaft 74. A driving pin 75 standing on a cam gear 66 contacts an inner cam 76 provided on the boat driving arm 73. Thus, the boat driving arm 73 is driven by a pivoting movement of the cam gear 66.

A gear 77 of the boat driving arm 73 is in engagement with a pinion 80 integrated with an S load gear 79, which is supported on the main chassis 8 by a shaft 78.

An S load arm 81 is coaxially supported with the S load gear 79. An S load link 82 is attached to the S load arm 81 via a shaft 83 so that the S load link 52 is rotatable with respect to the S load arm 81. The S load link 82 is also attached to the S boat 39 via a pin 41A so that the S load link 82 is rotatable with respect to the S boat 39.

A T load gear 84 is supported on the main chassis 8 by a shaft 85 and is engaged with the S load gear 79. A T load arm 86 is coaxially supported with the T load gear 84. A T load link 87 is attached to the T load arm 86 via a shaft 88 so that the T load link 87 is rotatable with respect to the T load arm 86. The T load link 87 is also attached to the T boat 40 via a pin 41C so that the T load link 87 is rotatable with respect to the T boat 40.

The S load arm 81 and the S load gear 79 are usually integrated together with a twisted coil spring (not shown) and are pivoted about the shaft 78. The S load gear 79, when rotated clockwise while the S load arm 81 is stopped, is urged counterclockwise by the twisted coil spring. Likewise, the T load arm 86 and the T load gear 84 are usually integrated together with a twisted coil spring (not shown) and are pivoted about the shaft 85. The T load gear 84, when rotated counterclockwise while the T load arm 86 is stopped, is urged clockwise by the twisted coil spring.

The S load gear 79 and the T load gear 84 are driven by a pivoting movement of the boat driving arm 73, and thus the S boat 39 and the T boat 40 move on the rail 42 (FIG. 12) via the S load link 82 and the T load link 87.

FIG. 15 is a plan view of the magnetic recording and reproduction apparatus 1200 when the tape 2 is loaded. FIG. 16 shows the boat driving arm 73 when the tape 2 is loaded.

The boat driving arm 73 has been rotated at a maximum possible angle counterclockwise. The S boat 39 and the T boat 40 each have moved to a prescribed position on the main chassis 8 via the gear 77, the S load gear 79, and the T load gear 84. A V-shaped edge 143 of the S boat 39 contacts a boat stopper 141 provided on the main chassis 8, and a V-shaped edge 144 of the T boat 40 contacts a boat stopper 142 also provided on the main chassis 8. Thus, the S boat 39 and the T boat 40 are positioned. The S load gear 79 and the S load arm 81 are integrally rotated while the S boat 39 is moving. The T load gear 84 and the T load arm 86 are integrally rotated while the T boat 40 is moving. The S link 82 and the S load arm 81 are structured so that the S boat 39 reaches a prescribed position in a certain mode, and the T link 87 and the T load arm 86 are structured so that the T boat 40 reaches a prescribed position in the mode. The boat driving arm 73 rotates the S load gear 79 clockwise and rotates the T load gear 84 counterclockwise, both beyond the prescribed positions. Therefore, a rotation phase difference is generated between the S load gear 79 and the S load arm 81 and between the T load gear 84 and the T load arm 86. Therefore, the S boat 39 is put into pressure-contact with the boat stopper 141 by a reaction force of a twisted coil spring (not shown), and the T boat 40 is put into pressure-contact with the boat stopper 142 by a reaction force of a twisted coil spring (not shown).

The above-described conventional tape loading system 1200 has the following problems.

(1) Two arms and two shafts are required in order to convey the driving force from the S load gear 79 to the S boat 39, and two arms and two shafts are required in order to convey the driving force from the T load gear 84 to the T boat 40. Eight components in total are required, which prevents reduction in the number of components.

(2) The S load arm 81 and the T load arm 86 each pivot across a large area during the loading and unloading operations. This makes it difficult to reduce the size of the tape loading system.

SUMMARY OF THE INVENTION

A magnetic recording and reproduction apparatus for loading a tape from a first state, in which the tape is mounted on a chassis, to a second state, in which a tape running path is formed as a result of a tape guide element pulling out and winding the tape at a prescribed position, the magnetic recording and reproduction apparatus is provided, magnetic recording and reproduction apparatus includes a tape guide element guiding member for guiding the tape guide element; a bendable chain-like driving member having a first end and a second end, the chain-like driving member being connected to the tape guide element guiding member at the first end, and the second end of the chain-like driving member being pulled or pushed so as to produce a reciprocating movement of the tape guide element guiding member; and a chain guiding member for guiding the chain-like driving member. The chain-like driving member includes a plurality of flexures for facilitating a bending movement of the chain-like driving member. The chain-like driving member causes a reciprocating movement of the tape guide element while being bent during a loading operation for transferring from the first state into the second state and an unloading operation for transferring from the second state into the first state.

In one embodiment of the invention, the plurality of flexures include flexures in a width direction and flexures in a thickness direction.

In one embodiment of the invention, the magnetic recording and reproduction apparatus further includes a motor rotatable forward and rearward; a rotational member connected to the motor; a chain engagement member provided on the rotational member; and a driving engagement member provided on the second end of the chain-like driving member for being engaged by the chain engagement member. Forward and rearward movement of the motor cause a reciprocating movement of the chain-like driving member.

In one embodiment of the invention, the chain engagement member and the driving engagement member are disengaged from each other either immediately before completion of the loading operation or immediately before completion of the unloading operation, so that the chain engagement member in not continuously engaged with the driving engagement member with respect to the rotation of the rotational member.

In one embodiment of the invention, the magnetic recording and reproduction apparatus further includes a projecting member integrated with the chain-like driving member and provided in the vicinity of the driving engagement member; and a projecting member guiding member for guiding the projecting member. The projecting member is guided by the projecting member guiding member so as to separate the driving engagement member from the chain engagement member either immediately before completion of the loading operation or immediately before completion of the unloading operation.

In one embodiment of the invention, the chain-like driving member includes a first chain-like driving member for driving a reciprocating movement of the tape guide element on a supply side on which the magnetic tape is pulled into the rotational head cylinder, and a second chain-like driving member for driving a reciprocating movement of the tape guide element on a takeup side on which the magnetic tape is pulled out from the rotational head cylinder.

In one embodiment of the invention, the magnetic recording and reproduction apparatus further includes a first rotational member; a second rotational member rotating in association with the first rotational member; a motor for driving the first rotational member and the second rotational member; a first chain engagement member provided on the first rotational member; a first driving engagement member provided on a second end of the first chain-like driving member for being engaged by the first chain engagement member; a second chain engagement member provided on the second rotational member; and a second driving engagement member provided on a second end of the second chain-like driving member for being engaged by the second chain engagement member. Forward and rearward movement of the motor drives a reciprocating movement of the first chain-like driving member and the second chain-like driving member.

In one embodiment of the invention, the chain guiding member includes an upper guiding member for guiding an upper portion of the chain-like driving member; a left guiding member for guiding a left portion of the chain-like driving member; a right guiding member for guiding a right portion of the chain-like driving member; and a lower guiding member for guiding a lower portion of the chain-like driving member, the lower guiding member being formed of a resin and fixed to a metal chassis of the magnetic recording and reproduction apparatus.

In one embodiment of the invention, the lower guiding member is formed integrally with the chassis as a result of inserting the chassis into a mold and then performing injection molding of the resin.

In one embodiment of the invention, a portion of the chain guiding member and a portion of the tape guide element guiding member are integrally formed of an identical material.

In one embodiment of the invention, the chain-like driving member has an elasticity in a longitudinal direction of at least 500 MPa.

In one embodiment of the invention, the chain-like driving member in formed of resin.

Thus, the invention described herein makes possible the advantages of providing a magnetic recording and reproduction apparatus including a low-cost, compact and easy-to-assemble tape loading mechanism having fewer elements.

These and other advantages of the present invention will become apparent to those skilled in the art upon reading and understanding the following detailed description with reference to the accompanying figures.

BRIEF DESCRIPTION OF THE DRAWINGS

FIG. 3A is an enlarged plan view of a chain-like driving member of the tape loading device shown in FIG. 1;

FIG. 3B is an enlarged side view of the chain-like driving member of the tape loading device shown in FIG. 1;

FIG. 4A is an enlarged partial plan view of a rail carrying a boat of the tape loading device shown in FIG. 1;

FIG. 4B is a side view of FIG. 4A;

FIG. 4C is a cross-sectional view of FIG. 4B taken along line L—L of FIG. 4B;

FIG. 4D is a cross-sectional view of FIG. 4B taken along line N—N of FIG. 4B;

FIG. 6A is a side view of the boat, chain-like driving member and a V-shaped stopper of the tape loading device shown in FIG. 1;

FIG. 6B is a cross-sectional view of FIG. 6A taken along line G—G;

FIG. 6C is view of FIG. 6A seen in the direction of arrow F;

DESCRIPTION OF THE PREFERRED EMBODIMENTS

Figure 1:
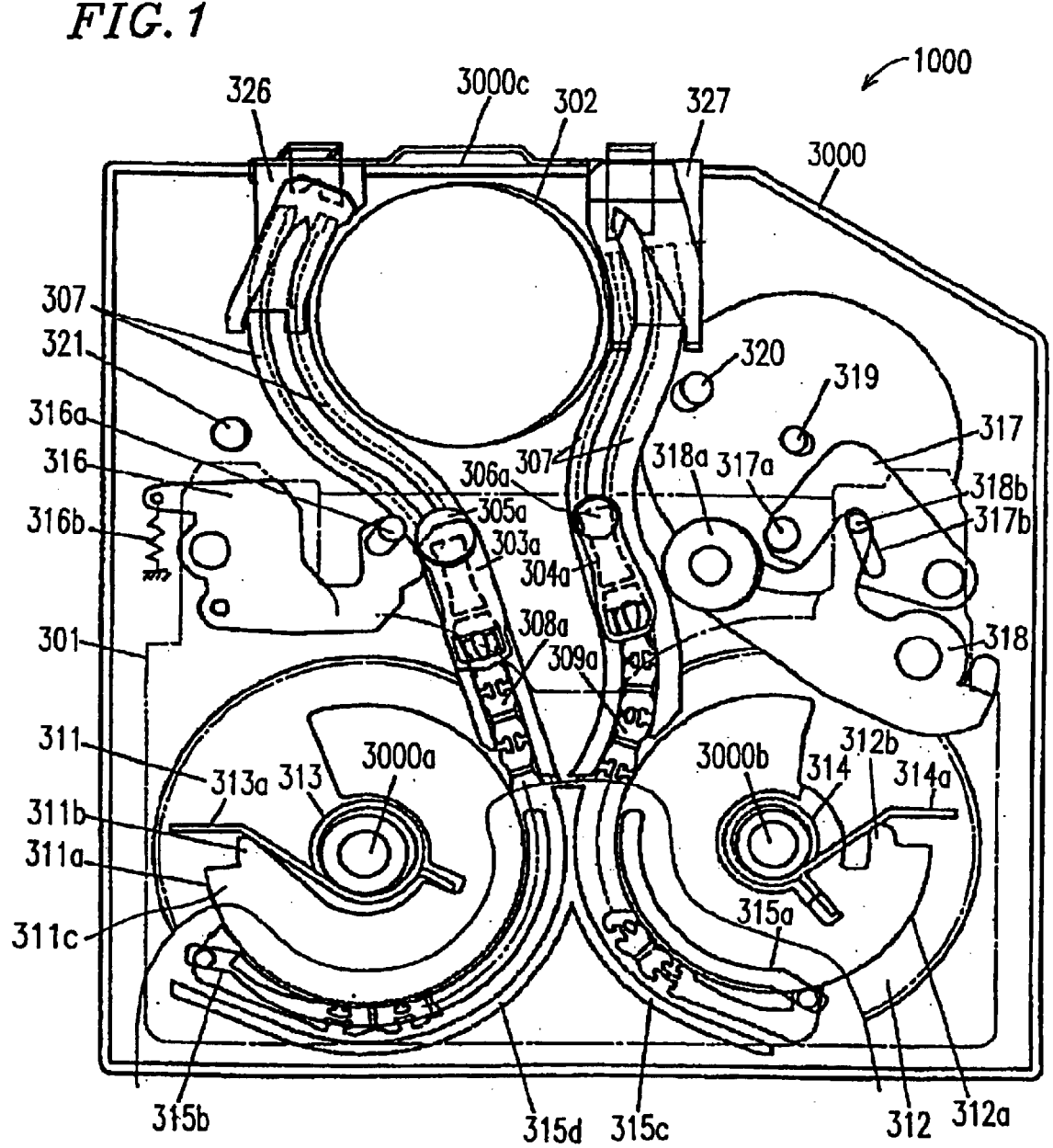
FIG. 1 is a plan view of a tape loading device according to an example of the present invention.

Hereinafter, the present invention will be described by way of illustrative examples with reference to the accompanying drawings. Identical elements in different examples bear identical reference numerals.

Figure 2:
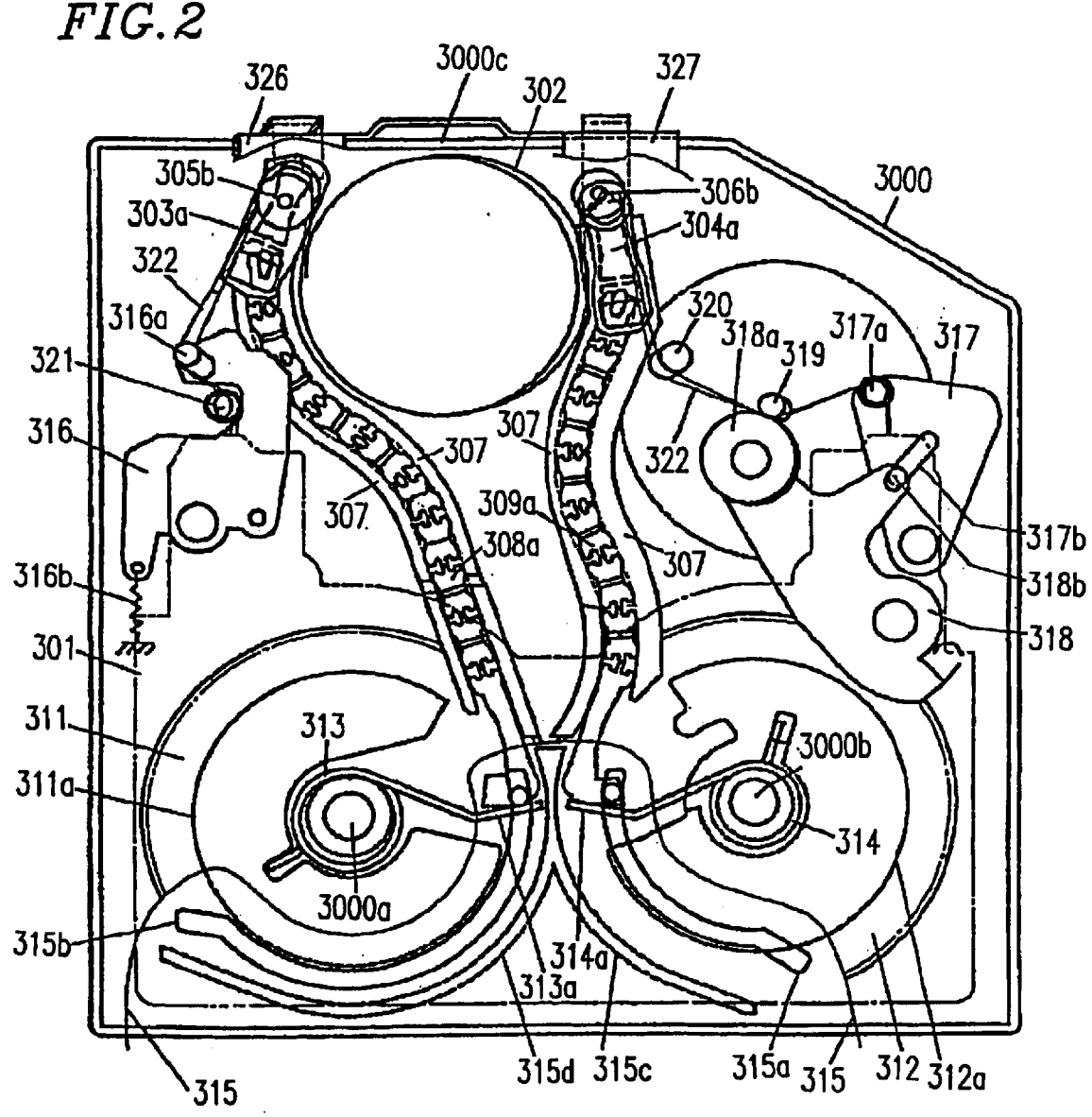
FIG. 2 is a partial plan view of the tape loading device shown in FIG. 1.

FIG. 1 is a plan view of a tape loading device 1000 according to an example of the present invention in the state where a tape has not been drawn from a tape cassette 301. FIG. 2 is a plan view of the tape loading device 1000 in the state where a magnetic tape 322 (hereinafter, referred to as the "tape 322") is drawn from the tape cassette 301 so as to be wound around a rotational head cylinder 2. With reference to FIGS. 1 and 2, a structure of the tape loading device 1000 will be described.

Fixed (i.e., non-roller) tape guide posts (tape guide elements) 320 and 321 are provided on a chassis 3000. A capstan motor shaft 319 and a pinch roller 318a hold the magnetic tape 322 therebetween so as to transport the magnetic tape 322.

The pinch roller 318a is provided on a pinch arm 318. The pinch roller 318a is pulled from the position shown in FIG. 1 to the position shown in FIG. 2 by a driving element (not shown) and is put into pressure-contact with the capstan motor shaft 319.

A tape pull-out post 316a projects from a tape pull-out arm 316, and a tape pull-out post 317a projects from a pull-out arm 317. The pull-out arms 316 and 317 are provided on the chassis 3000. The tape pull-out posts 316a and 317a are moved from the position shown in FIG. 1 to the position shown in FIG. 2 respectively by pivoting movements of the pull-out arms 316 and 317 caused by a driving element (not shown), so as to pull out the tape 322. A boss 318b provided on the pinch arm 318 is slidably engaged with a cam groove 317b formed in the pull-out arm 317. The pull-out arm 317 is driven by the movement of the pinch arm 318. A tension spring 316b is attached to the pull-out arm 316 at one end thereof. The other end of the tension spring 316b is fixed, for example, on the chassis 3000.

With reference to FIG. 1, a tape guide roller post 305a projects from a boat 303a (tape guide post guiding member), and a tape guide roller post 306a projects from a boat 304a (tape guide post guiding member). The boats 303a and 304a are each guided by a rail 307, and can each reciprocally move by a driving mechanism (described later) between the position shown in FIG. 1 (when the tape 322 is not loaded) and the position shown in FIG. 2 (when the tape 322 is is completely loaded).

The positions of the boats 303a and 304a in FIG. 1 will be referred to as the "unloading positions", and the positions of the boats 303a and 304a in FIG. 2 will be referred to as the "loading completion positions". A state in which the tape 322 is mounted on the chassis 3000 is defined as a first state. A state in which the tape guide roller post 305a and 306a pull out the tape 322 and wind the tape 322 at a prescribed position so as to form a tape running path is defined as a second state. An operation for moving from the first state to the second state is defined as a loading operation. An operation for moving from the second state to the first state is defined an an unloading operation, Due to the above-described structure, the tape 322 is pulled out from the tape cassette 301 and forms a tape path as shown in FIG. 2. The tape 322 is run as shown in FIG. 2 by the capstan motor shaft 319, the pinch roller 318a, and a reel table (not shown), which is engaged with a reel hub (not shown) in the tape cassette 301 for rotating the reel hub by a driving force of the capstan motor shaft 319.

Next, a method for driving the boats 303a and 304a will be described.

In FIG. 1, reference numerals 308a and 309a each refer to a chain-like driving member (flexible linkage mechanism). FIG. 3A is an enlarged plan view of the chain-like driving member 309a. FIG. 3B is an enlarged side view thereof. The chain-like driving member 308a is identical with the chain-like driving member 309a, and will not be described in detail. The chain-like driving member 309a includes a plurality of flexures along the entirety thereof, both in the width direction as represented by reference numerals A1 through A7 (FIG. 3A) and in the thickness direction as represented by reference numerals D1 through D6 (FIG. 3B). Therefore, the chain-like driving member 309a can freely bend in the direction of arrow P (FIG. 3A), and in the direction of arrow Q (FIG. 3B). The chain-like driving member 309a has a tower-like projection 309c at one end thereof, and has a cylindrical boss 309d (projecting member) at the other end thereof.

The chain-like driving member 309a is identical in principle and construction to the chain-like driving member 308a. Each is made up of a plurality of links which may be formed individually and linked together, or may be integrally joined, e.g., by a "living hinge" arrangement. As a particular example, the chain-like driving members 308a and 309a are formed from molded resin or the like, although it will be appreciated that other types of materials may be used without departing from the scope of the invention.

With reference to FIGS. 4A through 4D, the structure of the boat 304a, the chain-like driving member 309a, and the corresponding rail 307 will be described. The structure of boat 303a, the chain-like driving member 309a, and the corresponding rail 307 is identical therewith, and will not be described in detail for sake of brevity.

FIG. 4A is an enlarged partial plan view of the rail 307 carrying the boat 304a. FIG. 4B is a side view of FIG. 4A. FIG. 4C is a cross-sectional view of FIG. 4B taken along line L—L of FIG. 4B. FIG. 4D is a cross-sectional view of FIG. 4B taken along line N—N of FIG. 4B.

The rail 307 is provided from the vicinity of the unloading position of the boat 304a to the loading completion position of the boat 304a with its height changed, so as to cover a slope 310 (see, e.g., FIG. 6C) formed of resin, for example, which is integrally molded onto the metal chassis 3000 (e.g., via injection molding).

The boat 304a includes a base 304c on an opposite side of rail flanges 307a of the rail 307. Thus, the boat 304a can slide back and forth along the rail 307 in the direction of arrow M.

The chain-like driving member 309a is inserted into a space between the rail 307 and the slope 310, and can also slide in the direction of arrow M. The rail 307 and the slope 310 smoothly meanders laterally and vertically with respect to the chassis 3000. The chain-like driving member 309a is freely bendable laterally and vertically due to the plurality of flexures and thus can smoothly slide between the rail 307 and the slope 310. The interior walls of the rail 307 together with the top surface of the slope 310 form a channel along the length of the rail 307 which serves to guide the corresponding chain-like driving member 309a therethrough in both forward and reverse directions.

Therefore, the chain-like driving member 309a moves only between the rail 307 and the slope 310. Unlike the conventional structure, there are no spatial restrictions due to a large pivoting movement of the link mechanism. Therefore, the tape loading device 1000 in this example is space saving.

The projection 309c at one end of the chain-like driving member 309a is inserted into a hole 304d (FIGS. 4A and 4B) in a rear portion of the boat 304a with a prescribed gap. Due to this, a front face 399d of the projection 309c and an inclining face 304e of the boat 304a face each other. A rear face 309e of the projection 309c and a face 304f of the boat 304a face each other. The face 304f is disposed rearward with respect to the inclining face 304e. While the tape is being loaded, the front face 399d pushes the inclining face 304e, thereby sliding the boat 304a forward (to the right in FIG. 4B).

The inclining face 304e can be defined as a forward wall, and the face 304f can be defined as a rearward wall. The front face 399d of the projection 309c can be defined as a pressure-contact member.

Returning to FIG. 1, gears 311 and 312 are driven by a driving element (not shown). The gears 311 and 312 are respectively rotatably mounted around shafts 3000a and 3000b, which are integrally molded with the chassis 3000. Coiled springs 313 and 314 are respectively mounted about the centers of the gears 311 and 312. The coiled springs 313 and 314 integrally pivot with the gears 311 and 312, respectively. A movable end 313a of the coiled spring 313 is stopped by a stopper 311b (chain engagement member) of the gear 311. A movable end 314a of the coiled spring 314 is stopped by a stopper 312b (chain engagement member) of the gear 312.

Figure 5A:
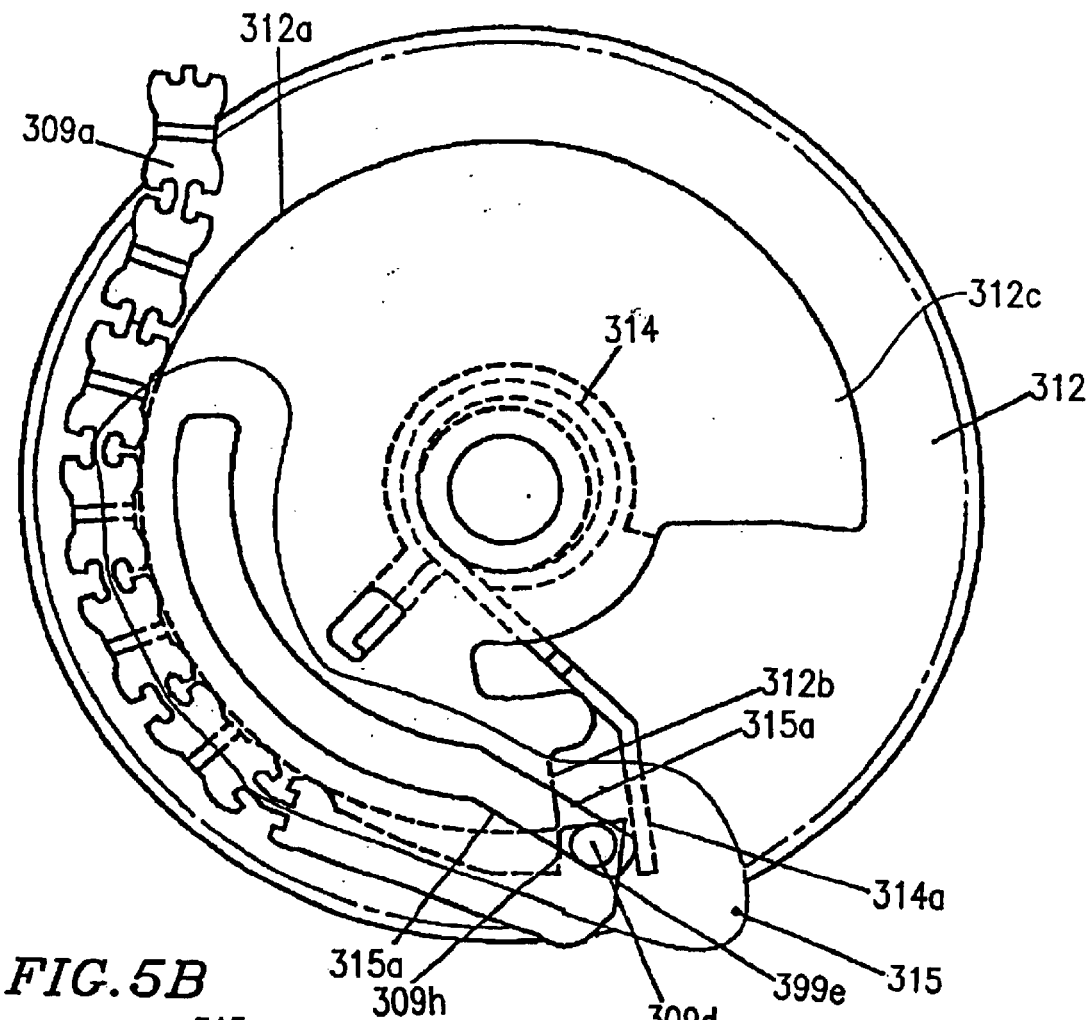
FIG. 5A is an enlarged plan view of a gear of the tape loading device shown in FIG. 1.
Figure 5B:
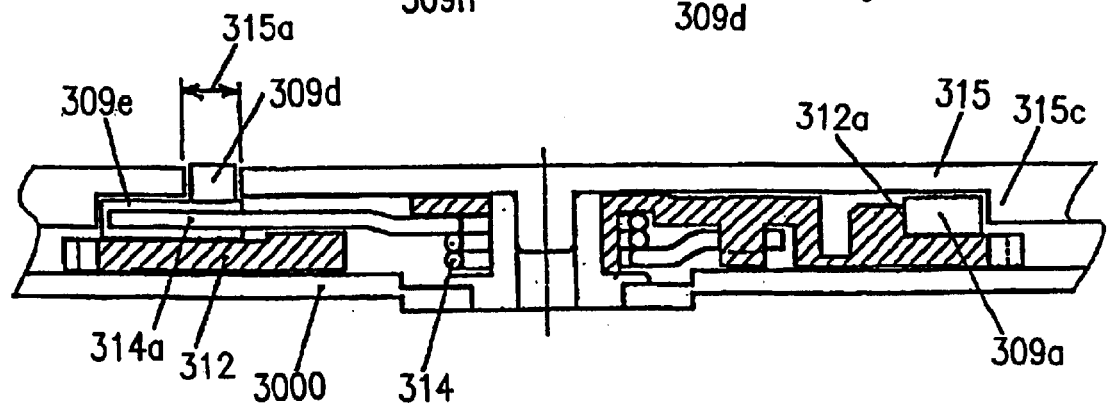
FIG. 5B is a side view of the gear shown in FIG. 5A.

FIG. 5A is an enlarged plan view of the gear 312, and FIG. 5B is a side view thereof. With reference to FIGS. 5A and 5B, the structure of the gear 312, the coiled spring 314 and the chain-like driving member 309a will be described. The structure of the gear 311, the coiled spring 313 and the chain-like driving member 308a are identical therewith, and will not be described in detail.

The gear 312 is provided between the chassis 3000 and a pressing plate 315. The chain-like driving member 309a can be wound around an outer circumferential surface 312a of a partially cut-out arc-shaped projection 312c. A guide 315d (FIG. 1) is provided so as to face the circumferential surface 312a with the chain-like driving member 309a interposed therebetween. A guide 315c (FIG. 1) is provided so as to face a circumferential surface 311a of a partially cut-out arc-shaped projection 311c of the gear 311.

The movable end 314a of the coiled spring 314 is at the same height as that of a pressing face 399e of the chain-like driving member 309a so that the movable end 314a can contact the pressing face 399e. The pressing plate 315 has a cam groove 315a, and the boss 309d of the chain-like driving member 309a is slidably engaged within the cam groove 315a.

In FIG. 1, V-shaped stoppers 326 and 327 are provided for positioning the tape guide roller posts 305a and 306a. The V-shaped stoppers 326 and 327 are integrally formed of sheet metal, and are attached to a wall 3000c of the chassis 3000.

FIG. 6A is a side view of the boat 304a, the chain-like driving member 309a and the V-shaped stopper 327, in the state where the tape guide roller post 306a is in pressure-contact with the V-shaped stopper 327. FIG. 6B is a cross-sectional view of FIG. 6A taken along line G—G. FIG. 6C is a partial view of FIG. 6A seen in the direction of arrow F. With reference to FIGS. 6A through 6C, the structure and function of the V-shaped stopper 327 will be described. The V-shaped stopper 326 has an identical structure function therewith, and will not described in detail.

The tape guide roller post 306a includes a roller shaft having an upper portion 306c which projects upward from an upper flange 306f, and a lower portion 306d which projects downward from a lower flange 306g. A roller is supported by the roller shaft between the flanges. The upper portion 306c has a top surface 306e. The V-shaped stopper 327 includes an upper portion 327c. a lower portion 327e, and a ceiling portion 327g. The lower portion 327e includes a lower V-shaped portion 327a for positioning the lower portion 306d of the tape guide roller post 306a. The upper portion 327c includes an upper V-shaped portion 327b for positioning the upper portion 306c of the tape guide roller post 306a. The ceiling portion 327g includes a ceiling portion 327d for positioning the top surface 306e of the tape guide roller post 306a. An attaching screw 318 attaches the V-shaped stopper 327 to the chassis 3000. The V-shaped stopper 327 is elastically bendable. The ceiling portion 327g is bent in the direction of arrow E and secured in that state by a screw 392. The lower portion 327e is bent in the direction of arrow A and secured in that state by a screw 391. By rotating the screw 392, the height of the ceiling portion 372g can be adjusted relative to the upper portion 327c. By rotating the screw 391, the position of the lower portion 327a in the direction of arrow A can be adjusted.

An operation of the tape loading device 1000 having the above-described structure will be described with reference to FIGS. 7 through 11.

Figure 7:
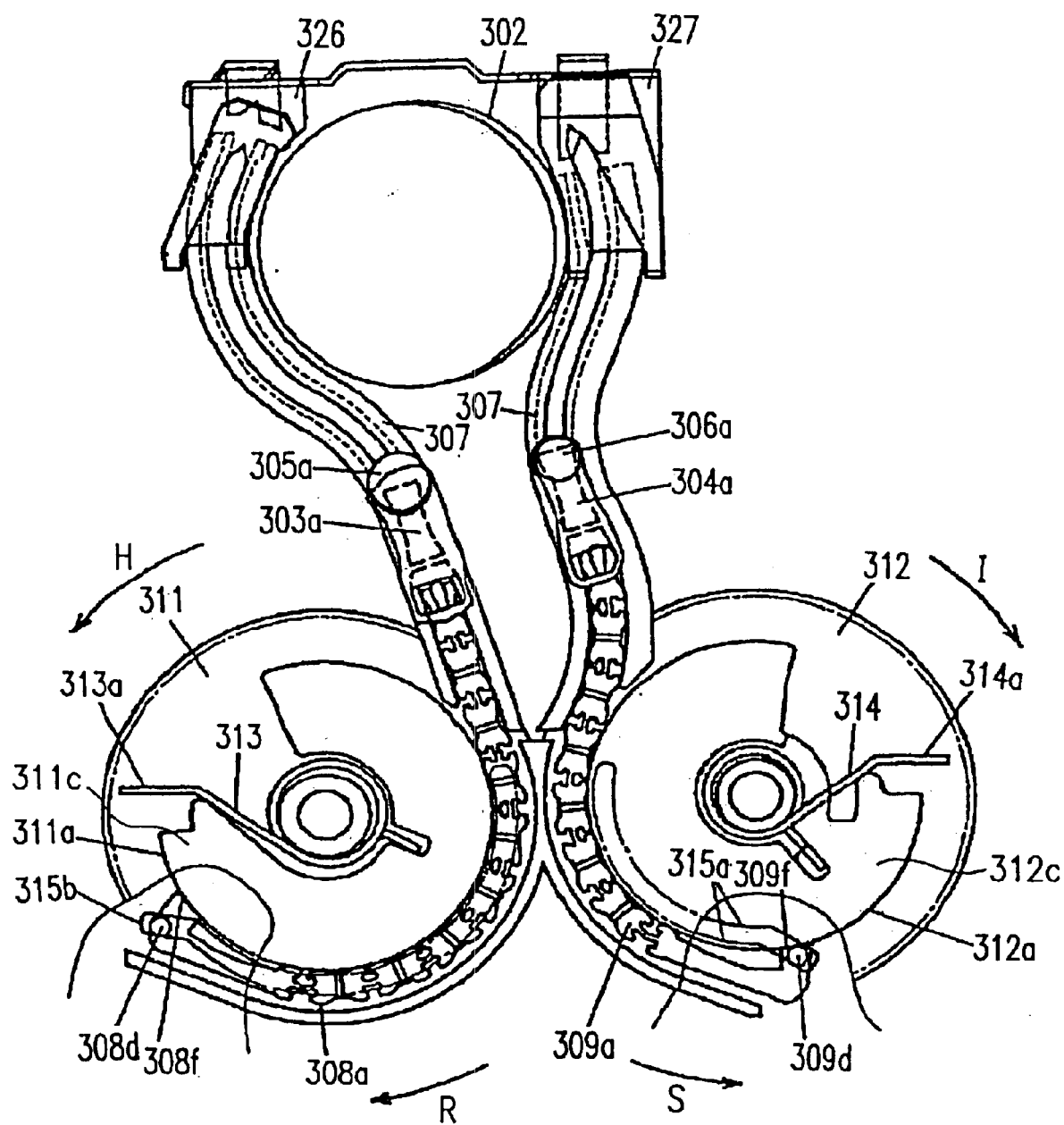
FIGS. 7 through 11 are plan views of the tape loading device shown in FIG. 1, illustrating a loading operation and an unloading operation performed by the tape loading device.

FIG. 7 shows the state where unloading is completed. In this state, each roller posts 305a and 306a are in the opening of the tape cassette (not shown).

From this state, the gears 311 and 312 are rotated by a driving element (e.g., a forward rotating motor which is not shown) in the direction of arrows H and I so as to start loading. In this state, however, the bosses 308d and 309d (projecting member) of the chain-like driving members 308a and 309a are guided by linear sections of the cam grooves 315b and 315a (projecting member guiding member), and also the faces 308f and 309f of the chain-like driving members 308a and 309a contact outer circumferential surfaces 311a and 312a of the arc-shaped projections 311c and 312c of the gears 311 and 312. Therefore, the chain-like driving members 308a and 309a do not rotate with the gears 311 and 312, and thus the boats 303a and 304a do not move.

Figure 8:
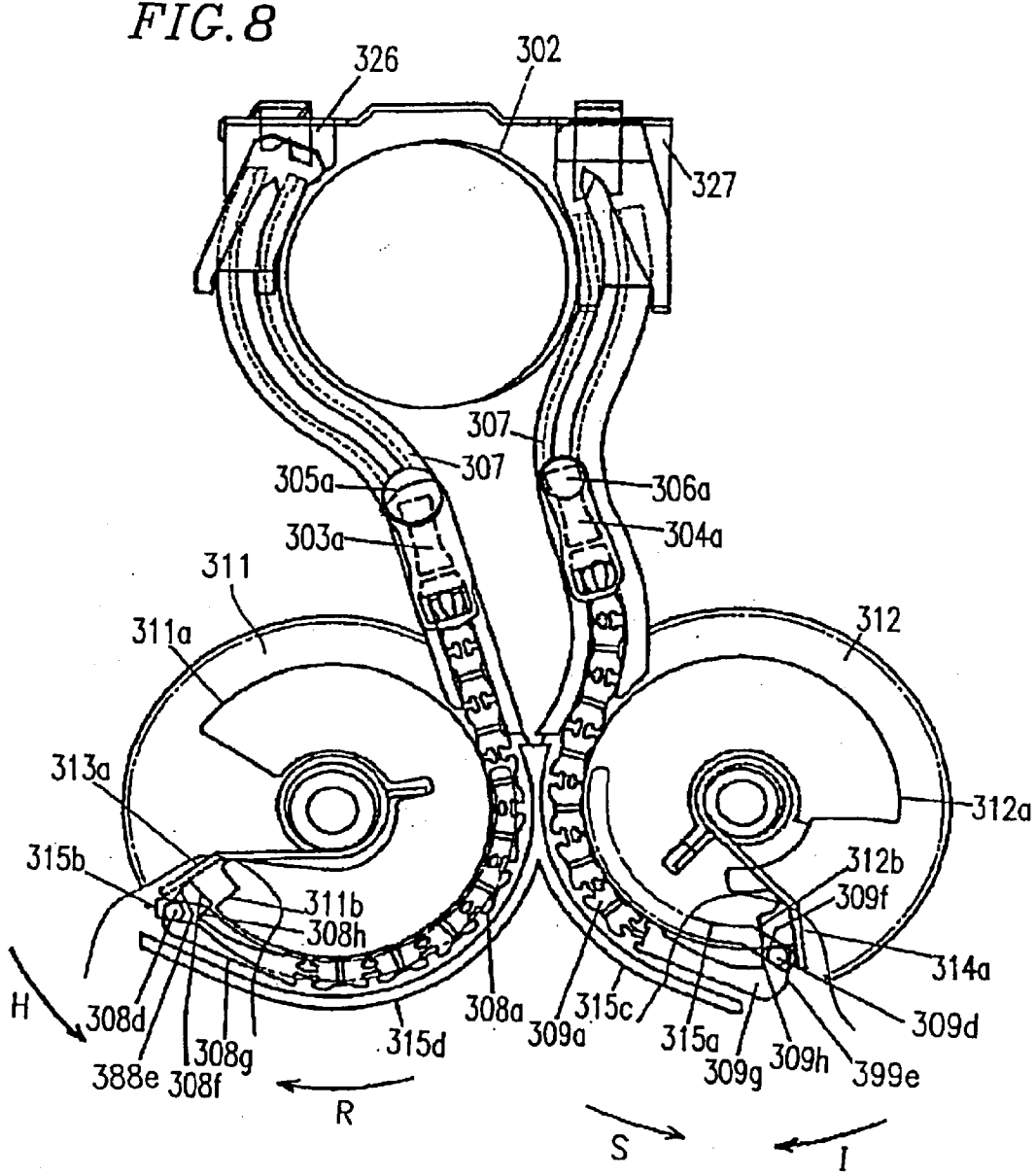

FIG. 8 shows the state where the gears 311 and 312 further rotate, and the boat 303a and 304a start loading.

In this state, the movable ends 313a and 314a of the coiled springs 313 and 314 integrally rotatable with the gears 311 and 312 contact the pressing surfaces 388e and 399e of the chain-like driving members 308a and 309a, and thus presses the chain-like driving members 308a and 309a in the directions of arrows H and I. In this state, the relative position between the chain-like driving members 308a and 309a and the gears 311 and 312 is changed, so that the faces 308f and 309f of the chain-like driving members 308a and 309a respectively face the cut-out portions of the arc-shaped projections 311c and 312c of the gears 311 and 312. Accordingly, as the gears 311 and 312 rotate, the bosses 308d and 309d are guided along the cam grooves 315b and 315a to go inside the gears 311 and 312, as shown in FIG. 9.

Figure 9:
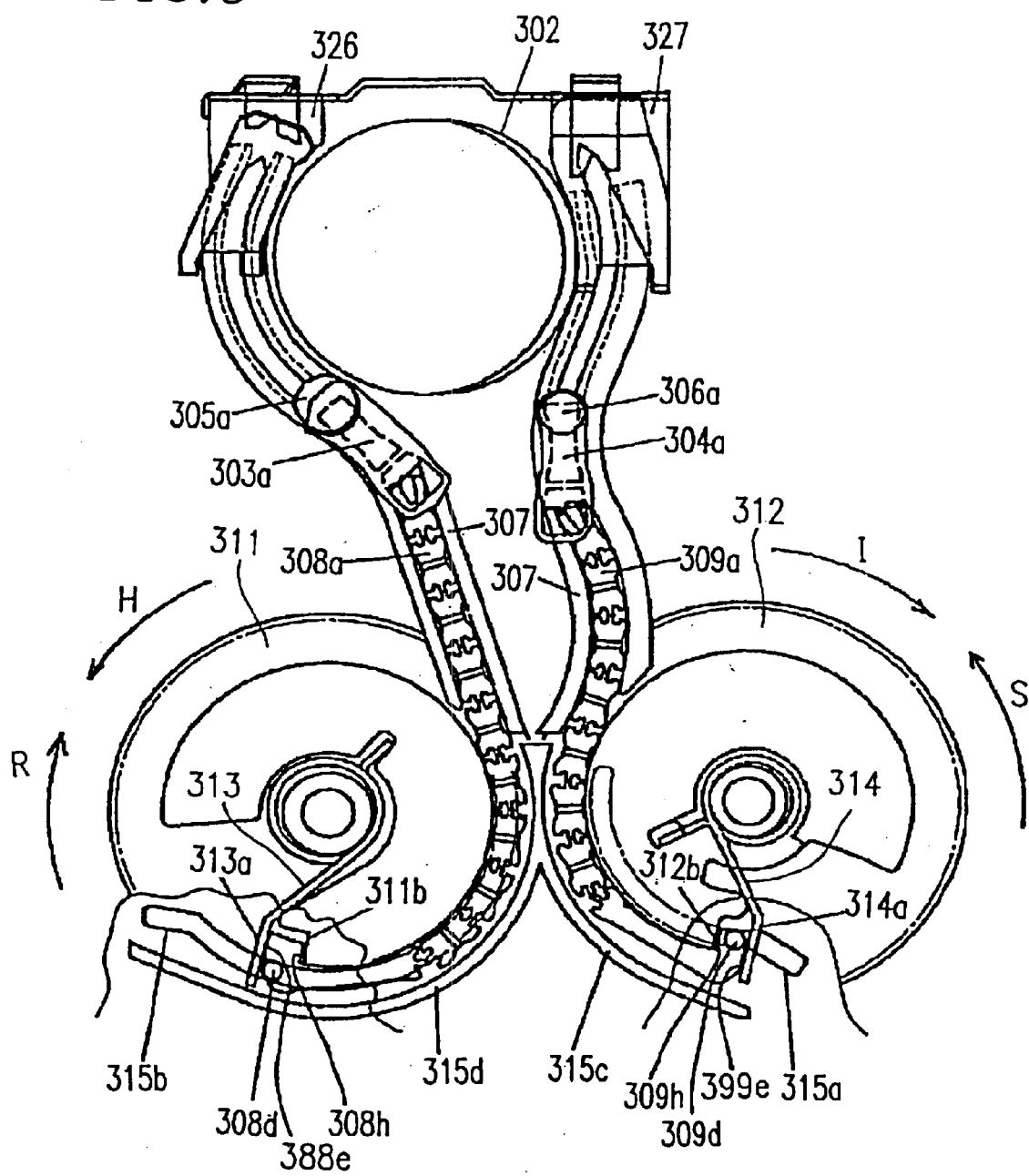

In FIG. 9, the boats 303a and 304a are being moved.

The coiled springs 313 and 314 press the pressing surfaces 388e and 399e, and the stoppers 311b and 312b face the engaging surfaces 308h and 309h (driving engagement member) of the chain-like driving members 308a and 309a. The bosses 308d and 309d are in engagement with arc-shaped portions of the cam grooves 315b and 315a, which are concentric with the gears 311 and 312. The arc-shaped guides 315d and 315c for guiding the chain-like driving members 308a and 309a are provided outside the chain-like driving members 308a and 309a. Therefore, the chain-like driving members 308a and 309a move in the directions of arrows H and I together with the gears 311 and 312 but are not diverted outside.

The chain-like driving members 308a and 309a move while being guided by the slopes 310 between the rails 307 and the chassis 3000, and thus drive the boats 303a and 304a to load the tape (not shown). Each chain-like driving member 308a, 309a preferably has an elasticity equal to or greater than 500 MPa in a longitudinal direction thereof, which provides the chain-like driving member 308a, 309a with a sufficient strength to withstand the load of the tape 22 and avoid deformation. Thus, the loading operation is performed smoothly.

Figure 10:
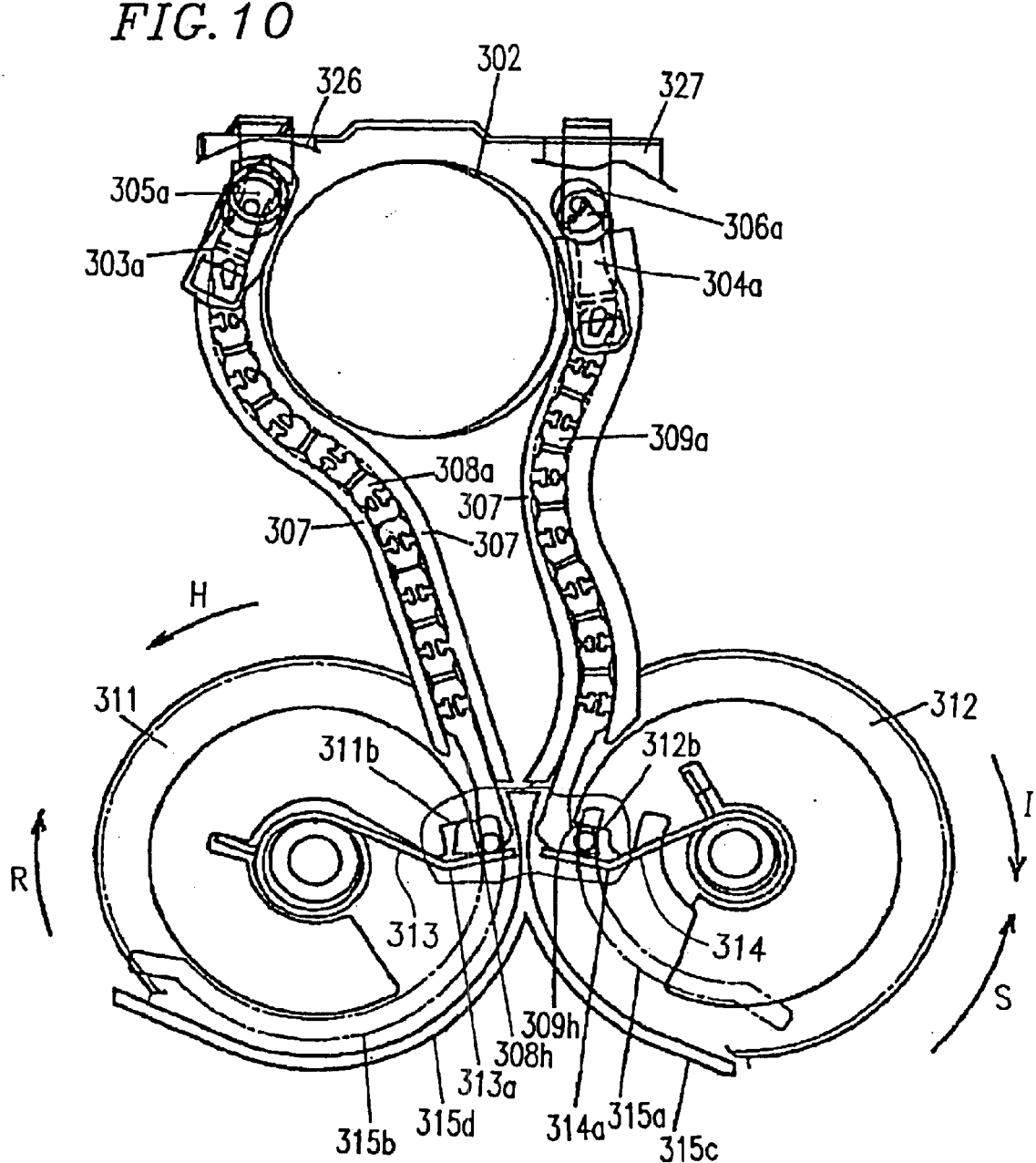

FIG. 10 shows the state of the tape guide roller posts 305a and 306a, the boats 303a and 304a, and the chain-like driving members 308a and 309a in the state where the tape guide roller posts 305a and 306a contact the V-shaped stoppers 326 and 327.

In this state, the tape (not shown) is wound around the rotational head cylinder 302. The tape guide roller posts 305a and 306a contact the V-stoppers 326 and 327 as shown in enlarged view of FIG. 6A.

In FIG. 10, the stoppers 311b and 312b of the gears 311 and 312 still face the engaging surfaces 308h and 309h of the chain-like driving members 308a and 309a.

Figure 11:
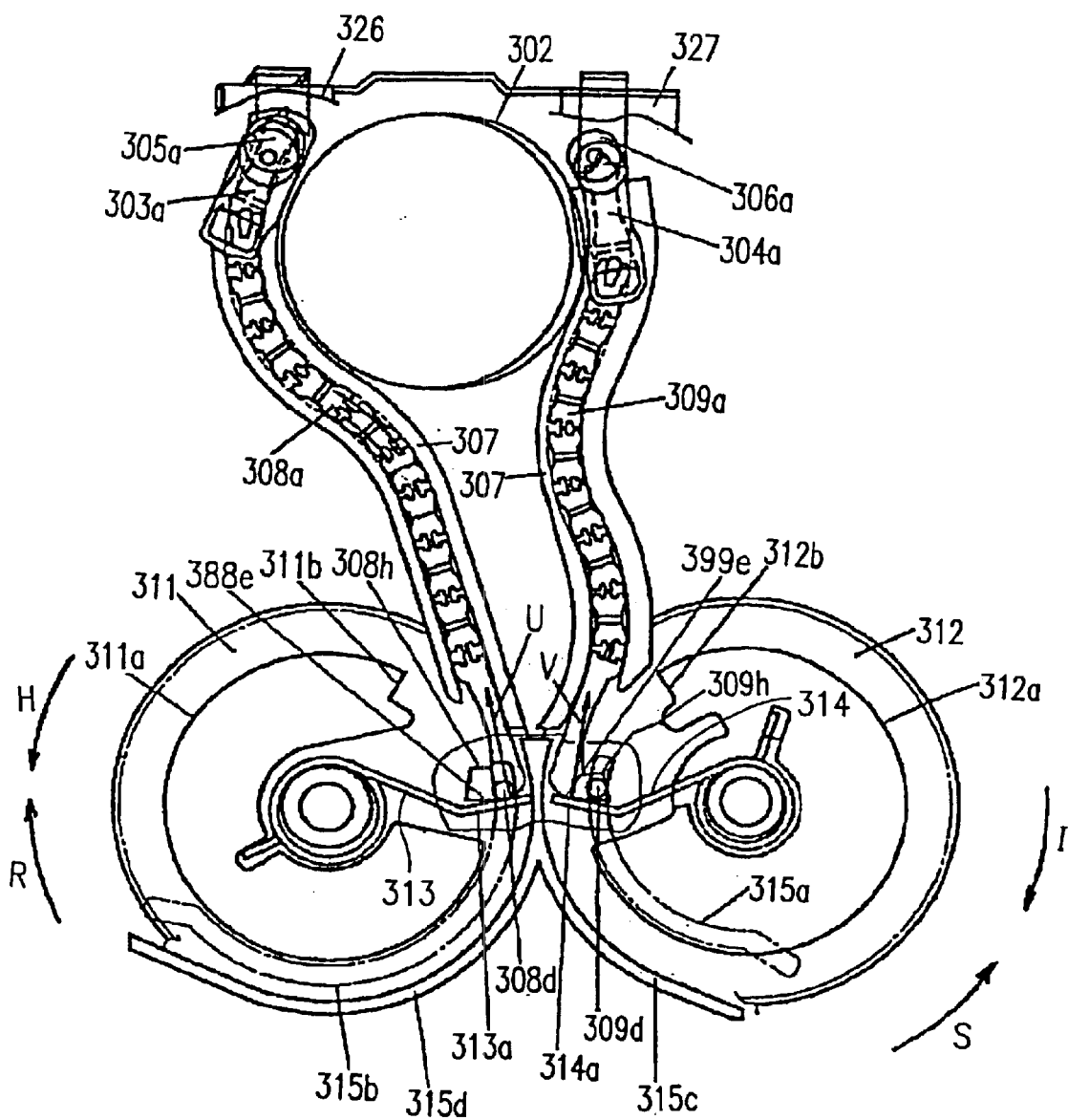
Figure 12:
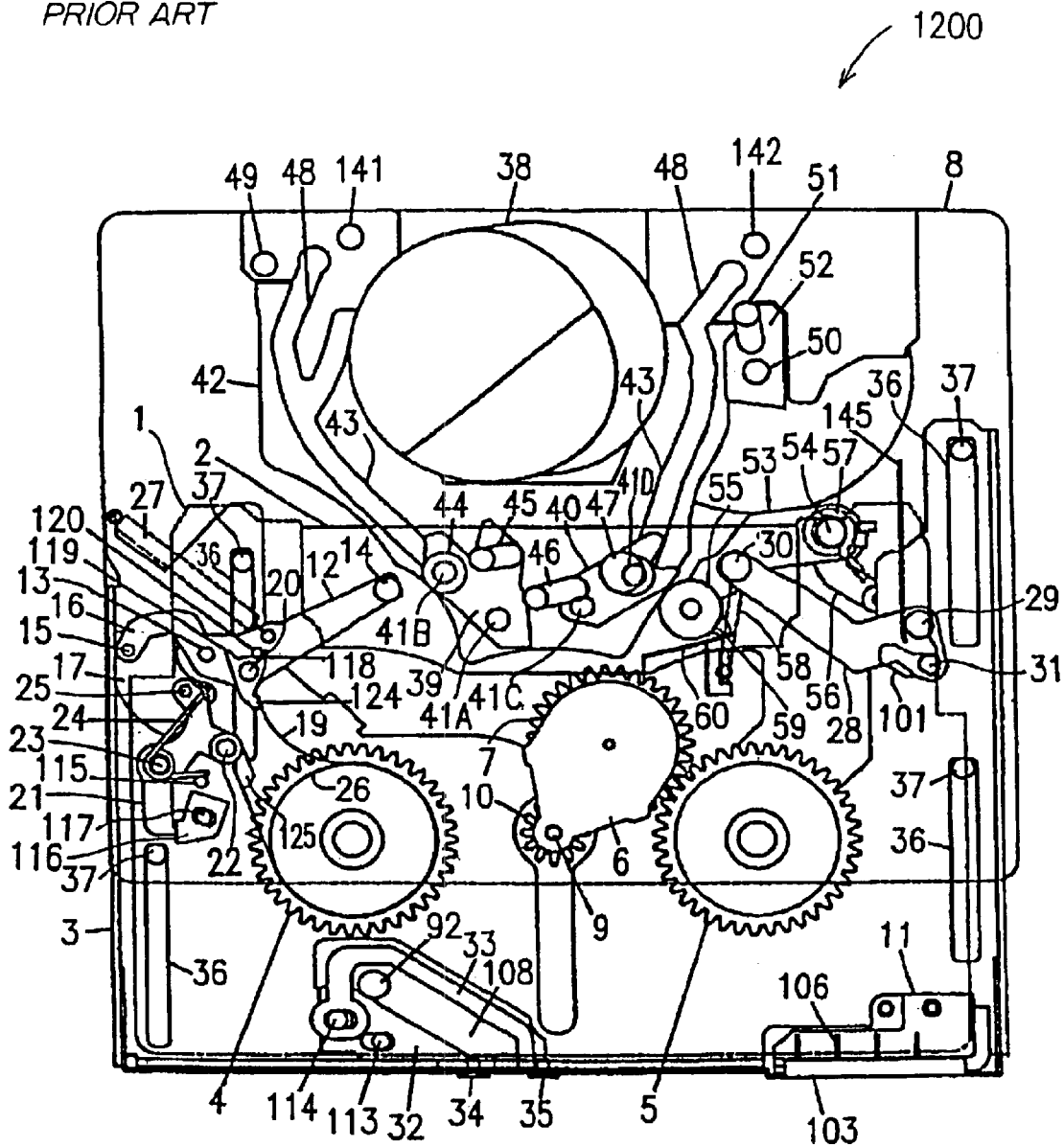
FIG. 12 its a plan view of a conventional magnetic recording and reproduction apparatus.
Figure 13:
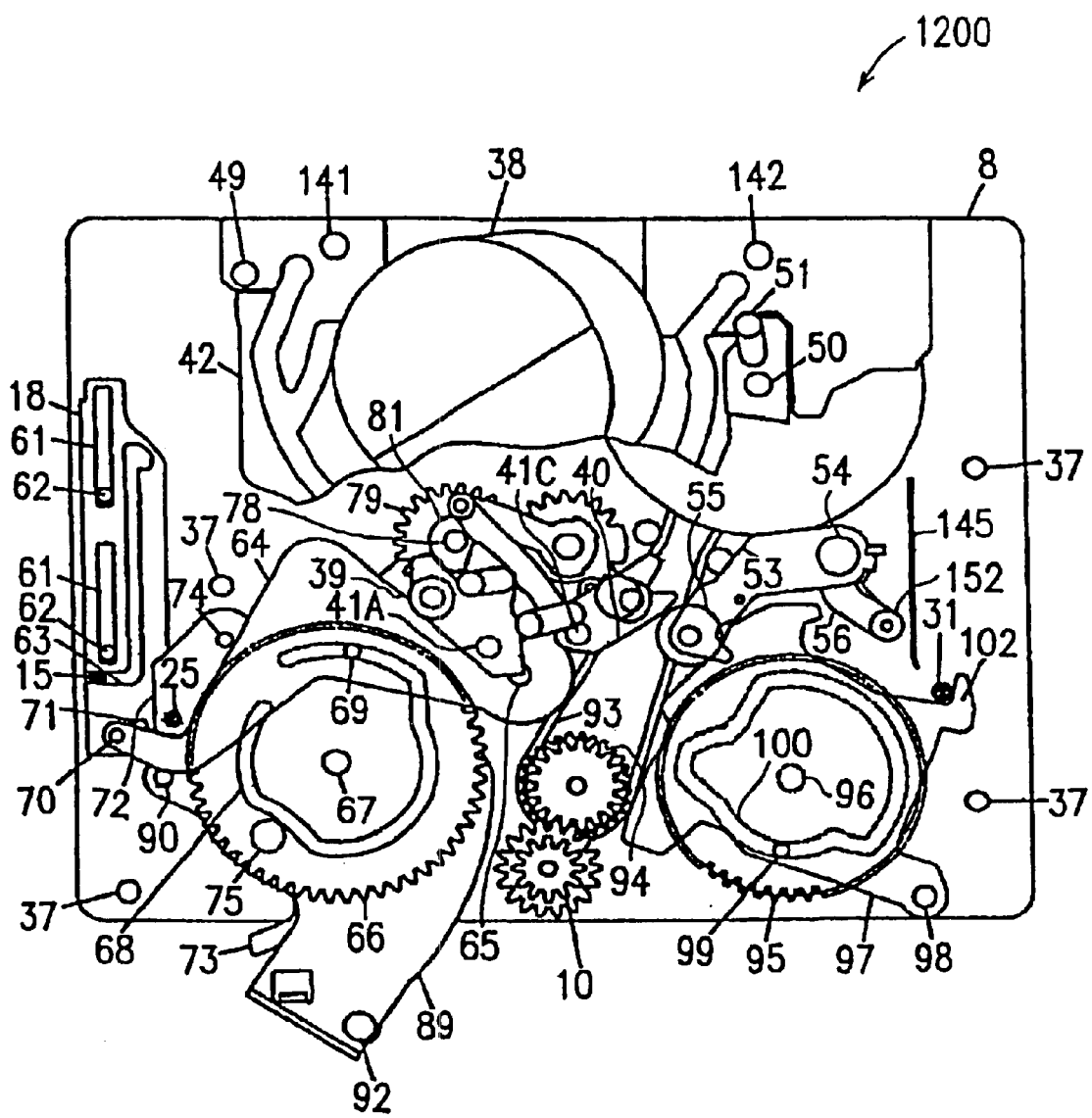
FIG. 13 is a partial plan view of the conventional magnetic recording and reproduction apparatus shown in FIG. 12.
Figure 14:
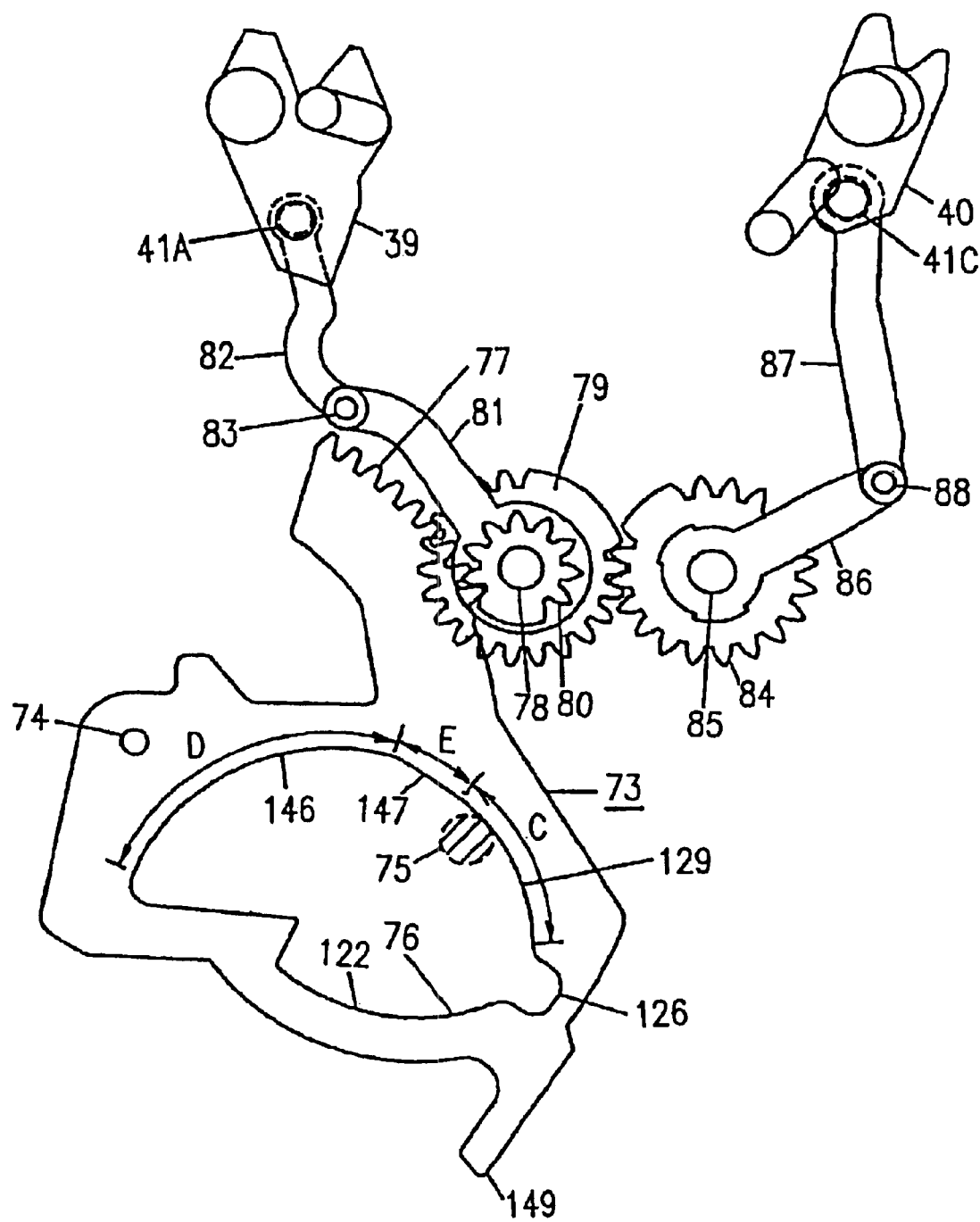
FIG. 14 is an enlarged view of boats of the conventional magnetic recording and reproduction apparatus shown in FIG. 12.
Figure 15:
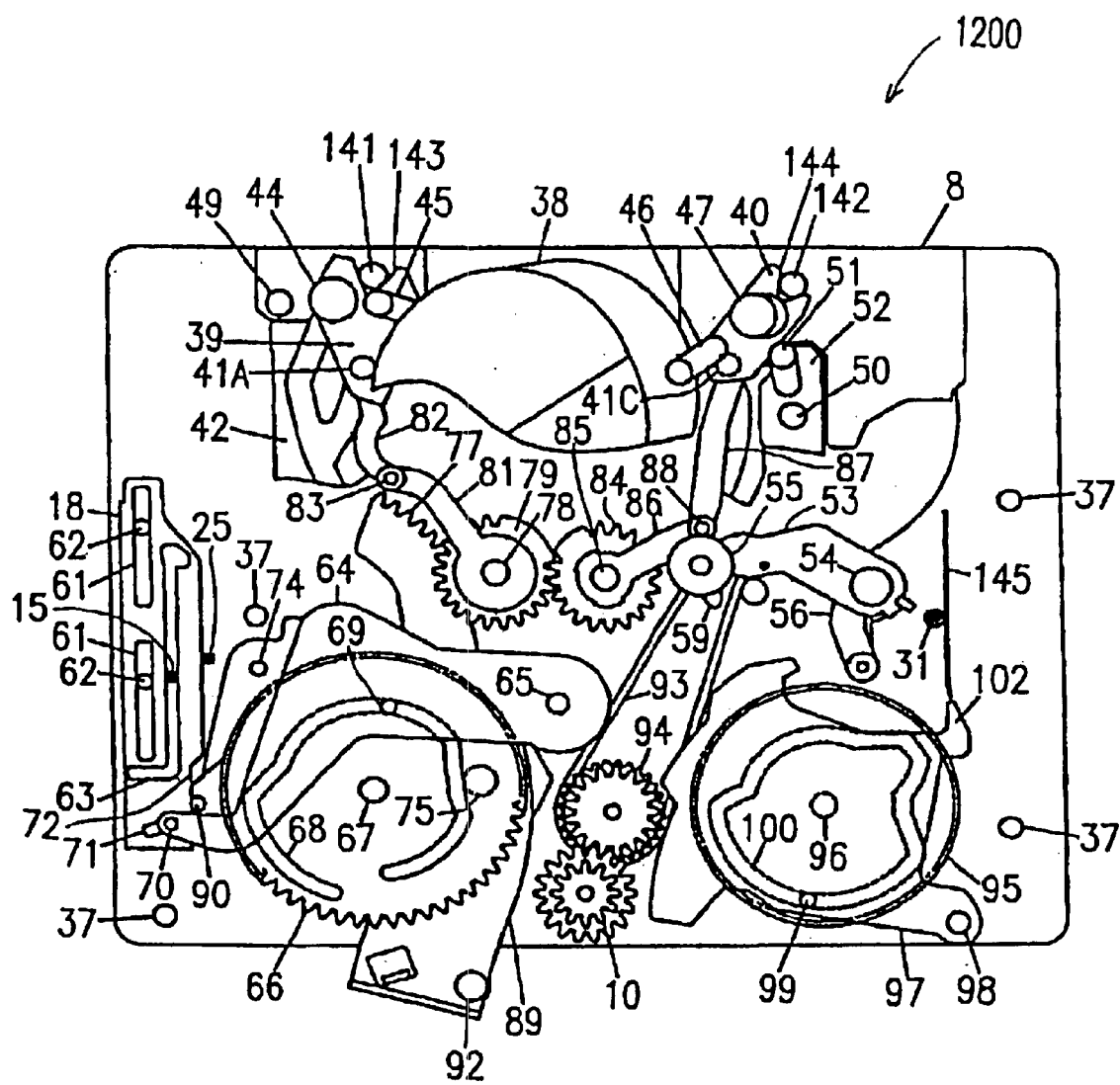
FIG. 15 is a plan view of the conventional magnetic recording and reproduction apparatus shown in FIG. 12 when a tape 2 is loaded.
Figure 16:
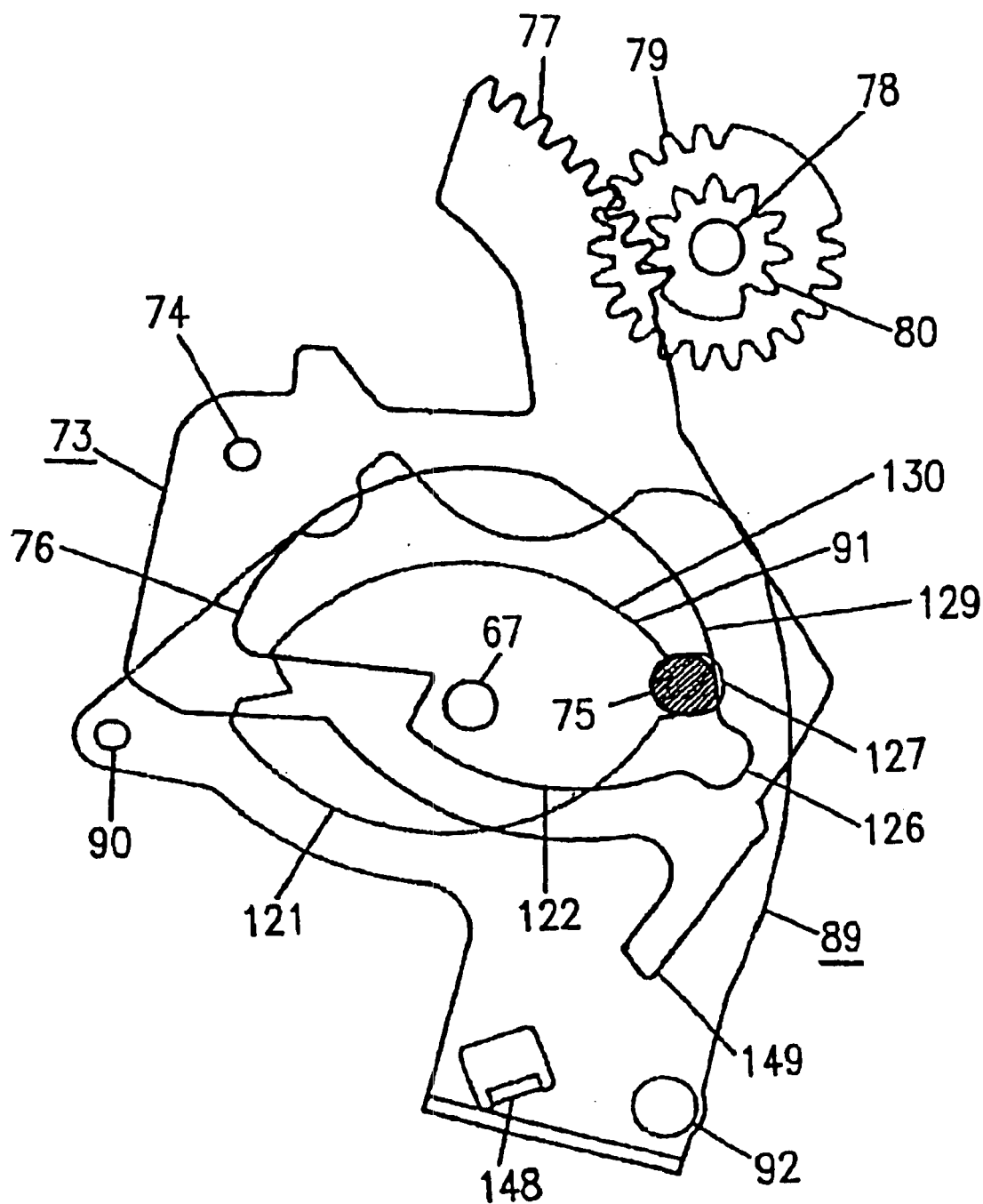
FIG. 16 is a boat driving arm of the conventional magnetic recording and reproduction apparatus shown in FIG. 12 when the tape is loaded.

FIG. 11 shows the state where the gears 311 and 312 further rotate in the directions of arrows H and I. The coiled springs 313 and 314 are bent. The reason is that since the tape guide roller posts 305a and 306a contact the V-shaped stoppers 326 and 327, the boats 303a and 304a and the chain-like driving members 308a and 309a do not move.

In FIG. 11, the coiled springs 313 and 314 respectively apply forces in the directions of arrows U and V to the chain-like driving members 308a and 309a. The chain-like driving members 308a and 309a, which are freely bendable, tend to slide along the rails 307 and the slopes 310. Thus, the chain-like driving members 308a and 309a convey the forces in the directions of arrows U and V to the boats 303a and 304a, so as to put the tape guide roller posts 305a and 306a into pressure-contact with the V-shaped stoppers 326 and 327.

The pressure-contact mechanism will be described with reference to FIG. 6A. FIG. 6A is a side view of the boat 304a, the chain-like driving member 309a and the V-shaped stopper 327 in the state shown in FIG. 11. A force V (FIG. 11) conveyed to the chain-like driving member 309a by the coiled spring 314 urges the chain-like driving member 309a in the direction of arrow B shown in FIG. 6A. The tower-like projection 309c of the chain-like driving member 309a contacts the inclining face 304e and thus urges the boat 304a in the direction of arrow C shown in FIG. 6A.

As a result, the boat 304a is urged to move in the direction of arrow C. Thus, the lower portion 306d of the tape guide roller post 306a is urged in the direction of arrow C1 so as to be put into pressure-contact with the lower V-shaped portion 327a of the V-shaped groove 327. The upper portion 306c of the tape guide roller post 306a is guided along guides 327c' (FIG. 6C) of the upper portion 327c and is urged In the direction of arrow C2 so as to be put into pressure-contact with and contacts the upper V-shaped portion 327b. The top surface 306e of the tape guide roller post 306a is guided along the ceiling portion 327g and is urged in the direction of arrow C3 so as to be put into pressure-contact with contacts the ceiling portion 327d. Thus, the tape guide roller post 306a is positioned at a prescribed angle and height. In this manner, the tape loading is completed.

The chain-like driving member 309a having a plurality of flexures, has an elasticity equal to or greater than 500 MPa in the longitudinal direction thereof. Thus, the chain-like driving member 309a can convey the urging forces to the boat 304a without being deformed or broken. A chain-like driving member formed of a material having an elasticity of less than 500 MPa may become broken or excessively deform so as not to perform the required operation with certainty.

As described above, the V-shaped stopper 327 is adjusted to be ideally positioned in the directions of arrows A and E by the screws 391 and 392. The center shaft of the tape guide roller post 306a is directly put into pressure-contact with the lower V-shaped portion 327a, the upper V-shaped portion 327b and the ceiling portion 327d with no other element interposed therebetween. Therefore, the tape guide roller post 306a can be positioned with a very high level of precision. Therefore, the tape can be wound around the rotational head cylinder 302 in an ideal state.

The tape is unloaded as follows. When the gears 311 and 312 rotate in the directions of arrows R and S as a result of the aforementioned driving element (e.g., the motor rotating in the opposite or reverse direction), the coiled springs 313 and 314 return to the state shown in FIG. 10, where the coiled springs 313 and 314 are more relaxed. In FIG. 10, the stoppers 311b and 312b of the gears 311 and 312 are engaged with the engaging surfaces 308h and 309h and thus pull the chain-like driving members 308a and 309a in the directions of arrows R and S. The rear face 309e of the chain-like driving member 309a (FIG. 6A) contacts the face 304f of the boat 304a, and thus drives the boat 304a in the direction of arrow D (FIG. 6A).

Thus, the boats 303a and 304a are unloaded from the state of FIG. 10 to the state shown in FIG. 9 and then to the state shown in FIG. 8. In the state shown in FIG. 8, the roller posts 305a and 306a are accommodated in the opening of the tape cassette (not shown). In this state, the bosses 308d and 309d of the chain-like driving members 308a and 309a are guided by the cam grooves 315b and 315a, and the chain-like driving members 308a and 309a are pulled outside of the gears 311 and 312. The stoppers 311b and 312b are disengaged from the engaging surfaces 308h and 309h, and thus the chain-like driving members 308a and 309a are disassociated from the rotation of the gears 311 and 312. Accordingly, the gears 311 and 312 can be further rotated in the directions of arrows R and S. In a magnetic recording and reproduction apparatus, after the roller posts 305*a* and 306*a* return to the positions in the opening of the tape cassette, the tape needs to be detached by, for example, lifting the cassette lifting device. This operation can be performed by using the above-mentioned further rotation of the gears 311 and 312. Thus, the magnetic recording and reproduction apparatus 1000 is put into the state shown in FIG. 7. The unloading of the tape is completed.

A magnetic recording and reproduction apparatus according to the present invention includes a tape guide element guiding member for guiding the tape guide element; a bendable chain-like driving member having a first end and a second end, the chain-like driving member being connected to the tape guide element guiding member at the first end, and the second end of the chain-like driving member being pulled or pushed so as to produce a reciprocating movement of the tape guide element guiding member; and a chain guiding member for guiding the chain-like driving member. The chain-like driving member includes a plurality of flexures for facilitating a bending movement of the chain-like driving member. The chain-like driving member causes a reciprocating movement of the tape guide element while being bent during a loading operation for transferring from the first state into the second state and an unloading operation for transferring from the second state Into the first state. The chain-like driving member may have an elasticity in a longitudinal direction of at least 500 MPa. The chain-like driving member may be formed of resin.

According to such a structure, a space-saving tape loading mechanism including a small number of element is provided. Thus, a magnetic recording and reproduction apparatus having a tape loading mechanism including a small number of element is provided.

In the case where the plurality of flexures include flexures in a width direction and flexures in a thickness direction, the chain-like driving mechanism can smoothly slide along the chain guiding member and efficiently convey the driving force to the tape guide element guiding member. In addition, creep and breakage due to bending can be avoided. The reliability of the tape loading mechanism can be enhanced.

In the case where the chain-like driving member is engaged with and driven by the rotational member, the chain-like driving member can be smoothly moved in a limited space.

In the case where the chain-like driving member is guided by the projection guiding member (a cam groove or a recess portion), the chain-like driving member is not continuously engaged with the rotational member either immediately before completion of the loading operation or immediately before completion of the unloading operation. Thus, even when the chain-like driving member is not moved, the rotational member can move so as to form a different mode. This facilitates the operation of the tape loading mechanism.

In the case where a chain-like driving member is provided on each of a supply side on which the magnetic tape is pulled into the rotational head cylinder and a takeup side on which the magnetic tape is pulled out from the rotational head cylinder, the number of the components of the tape loading mechanism and thus the cost of the magnetic recording and reproduction apparatus can be further reduced.

The moving distance of the tape guide element is different between the supply side and the takeup side. In the case where separate rotational members are respectively provided for the supply side and the takeup side, the chain-like driving member can be moved by an appropriate distance. Thus, the optimum tape loading is realized easily.

In the case where the chain guiding member guides the an upper portion, a left portion, a right portion and a lower portion of the chain-like driving member, the chain-like driving member can be smoothly guided. In the case where the lower guiding member is attached to a metal chassis of the magnetic recording and reproduction apparatus, the precision and the strength of the chain guiding member can be improved.

In the case where the lower guiding member is integrally molded with the chassis, the number of the elements and thus the cost of the magnetic recording and reproduction apparatus can be reduced.

In the case where the tape guide element guiding member and the chain guiding member are integrally molded together of an identical material, the number of elements is reduced and further space saving is realized. Thus, a low-cost and compact magnetic recording and reproduction apparatus can be provided.

As described above, the present invention provides a magnetic recording and reproduction apparatus including a low-cost, compact and easy-to-assemble tape loading mechanism having fewer elements.

Various other modifications will be apparent to and can be readily made by those skilled in the art without departing from the scope and spirit of this invention. Accordingly, it is not Intended that the scope of the claims appended hereto be limited to the description as set forth herein, but rather that the claims be broadly construed.

What is claimed is:

1. A magnetic recording and reproduction apparatus for loading a tape from a first state, in which the tape is mounted on a chassis, to a second state, in which a tape running path is formed as a result of a tape guide element pulling out and winding the tape at a prescribed position, the magnetic recording and reproduction apparatus comprising:
   a tape guide element guiding member for guiding the tape guide element;
   a bendable chain-like driving member having a first end and a second end, the chain-like driving member being connected to the tape guide element guiding member at the first end, and the second end of the chain-like driving member being pulled or pushed so as to produce a reciprocating movement of the tape guide element guiding member; and
   a chain guiding member for guiding the chain-like driving member,
   wherein:
      the chain-like driving member includes a plurality of flexures for facilitating a bending movement of the chain-like driving member, and
      the chain-like driving member causes a reciprocating movement of the tape guide element while being bent during a loading operation for transferring from the first state into the second state and an unloading operation for transferring from the second state into the first state.

2. A magnetic recording and reproduction apparatus according to claim 1, wherein the plurality of flexures include flexures in a width direction and flexures in a thickness direction.

3. A magnetic recording and reproduction apparatus according to claim 1, further comprising:
   a motor rotatable forward and rearward;
   a rotational member connected to the motor;
   a chain engagement member provided on the rotational member; and a driving engagement member provided on the second end of the chain-like driving member for being engaged by the chain engagement member, wherein forward and rearward movement of the motor cause a reciprocating movement of the chain-like driving member.

4. A magnetic recording and reproduction apparatus according to claim 3, wherein the chain engagement member and the driving engagement member are disengaged from each other either immediately before completion of the loading operation or immediately before completion of the unloading operation, so that the chain engagement member is not continuously engaged with the driving engagement member with respect to the rotation of the rotational member.

5. A magnetic recording and reproduction apparatus according to claim 4, further comprising:

a projecting member integrated with the chain-like driving member and provided in the vicinity of the driving engagement member; and a projecting member guiding member for guiding the projecting member, wherein the projecting member is guided by the projecting member guiding member so as to separate the driving engagement member from the chain engagement member either immediately before completion of the loading operation or immediately before completion of the unloading operation.

6. A magnetic recording and reproduction apparatus according to claim 1, wherein the chain-like driving member includes a first chain-like driving member for driving a reciprocating movement of the tape guide element on a supply side on which the magnetic tape is pulled into a rotational head cylinder, and a second chain-like driving member for driving a reciprocating movement of the tape guide element on a takeup side on which the magnetic tape is pulled out from the rotational head cylinder.

7. A magnetic recording and reproduction apparatus according to claim 6, further comprising:

a first rotational member;

a second rotational member rotating in association with the first rotational member;

a motor for driving the first rotational member and the second rotational member;

a first chain engagement member provided on the first rotational member;

a first driving engagement member provided on a second end of the first chain-like driving member for being engaged by the first chain engagement member;

a second chain engagement member provided on the second rotational member; and a second driving engagement member provided on a second end of the second chain-like driving member for being engaged by the second chain engagement member, wherein forward and rearward movement of the motor drives a reciprocating movement of the first chain-like driving member and the second chain-like driving member.

8. A magnetic recording and reproduction apparatus according to claim 1, wherein the chain guiding member includes:

an upper guiding member for guiding an upper portion of the chain-like driving member;

a left guiding member for guiding a left portion of the chain-like driving member;

a right guiding member for guiding a right portion of the chain-like driving member; and a lower guiding member for guiding a lower portion of the chain-like driving member, the lower guiding member being formed of a resin and fixed to a metal chassis of the magnetic recording and reproduction apparatus.

9. A magnetic recording and reproduction apparatus according to claim 8, wherein the lower guiding member is formed integrally with the chassis as a result of inserting the chassis into a mold and then performing injection molding of the resin.

10. A magnetic recording and reproduction apparatus according to claim 1, wherein a portion of the chain guiding member and a portion of the tape guide element guiding member are integrally formed of an identical material.

11. A magnetic recording and reproduction apparatus according to claim 1, wherein the chain-like driving member has an elasticity in a longitudinal direction of at least 500 MPa.

12. A magnetic recording and reproduction apparatus according to claim 1, wherein the chain-like driving member is formed of resin.

* * * * *